(12) United States Patent
Wagman et al.

(10) Patent No.: US 9,096,759 B2
(45) Date of Patent: *Aug. 4, 2015

(54) PRINTING FORM AND PROCESS FOR PREPARING THE PRINTING FORM WITH CURABLE COMPOSITION HAVING SOLVENT-FREE EPOXY RESIN

(71) Applicant: E I DU PONT DE NEMOURS AND COMPANY, Wilmington, DE (US)

(72) Inventors: Mark E Wagman, Wilmington, DE (US); Helen S M Lu, Wallingford, PA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 218 days.

This patent is subject to a terminal disclaimer.

(21) Appl. No.: 13/718,175

(22) Filed: Dec. 18, 2012

(65) Prior Publication Data

US 2013/0165549 A1 Jun. 27, 2013

Related U.S. Application Data

(60) Provisional application No. 61/578,322, filed on Dec. 21, 2011.

(51) Int. Cl.
| | |
|---|---|
| *B41C 1/02* | (2006.01) |
| *B05D 3/02* | (2006.01) |
| *C09D 163/00* | (2006.01) |
| *B41M 1/10* | (2006.01) |
| *C08L 63/04* | (2006.01) |
| *B41C 1/045* | (2006.01) |
| *B41C 1/05* | (2006.01) |
| *B41C 1/18* | (2006.01) |
| *B41N 1/22* | (2006.01) |

(52) U.S. Cl.
CPC ............... *C08L 63/04* (2013.01); *B41C 1/045* (2013.01); *B41C 1/05* (2013.01); *B41C 1/18* (2013.01); *B41M 1/10* (2013.01); *B41N 1/22* (2013.01)

(58) Field of Classification Search
CPC ...... B05D 3/02; B05D 3/0209; B05D 3/0254; B05D 3/14; C09D 163/00; B41C 1/02; B41M 1/10
USPC .......... 427/355, 356, 358, 379, 386; 523/427, 523/428, 440, 442, 443; 525/524; 101/170
See application file for complete search history.

(56) References Cited

U.S. PATENT DOCUMENTS

| | | | |
|---|---|---|---|
| 3,294,889 A | 12/1966 | Downie et al. | |
| 4,007,680 A | 2/1977 | Pfleger et al. | |
| 4,054,455 A | 10/1977 | Schlesinger et al. | |
| 4,256,828 A | 3/1981 | Smith | |
| 4,528,909 A | 7/1985 | Rigg et al. | |
| 4,642,248 A | 2/1987 | Howland | |
| 4,656,090 A | 4/1987 | Markovitz | |
| 4,702,946 A | 10/1987 | Howland | |
| 4,757,117 A | 7/1988 | Moss | |
| 5,694,852 A | 12/1997 | Bressler et al. | |
| 6,136,375 A | 10/2000 | Bressler et al. | |
| 6,350,490 B1 | 2/2002 | Bressler et al. | |
| 2003/0049377 A1 | 3/2003 | Chesnut et al. | |
| 2005/0202177 A1 | 9/2005 | Chesnut et al. | |
| 2007/0137506 A1 | 6/2007 | Chesnut et al. | |
| 2010/0248139 A1 | 9/2010 | Sugasaki | |
| 2012/0285342 A1* | 11/2012 | Adelman et al. | 101/401 |
| 2012/0285930 A1* | 11/2012 | Adelman et al. | 216/94 |

FOREIGN PATENT DOCUMENTS

| | | |
|---|---|---|
| EP | 0094142 A1 | 7/1983 |
| EP | 1067436 A1 | 1/2001 |
| GB | 916246 | 1/1963 |
| GB | 1544748 | 4/1979 |
| GB | 2071574 A | 9/1981 |
| GB | 2087796 A | 6/1982 |
| GB | 1465364 | 2/1997 |
| WO | 91/16200 | 10/1991 |
| WO | 03/037630 A1 | 5/2003 |

OTHER PUBLICATIONS

IM1390 PCT Search Report, (No Date).
Pram, Ha. Q. and Marks, Maurice J., Epoxy Resins, Encyclopedia of Polymer Science and Technology, 4$^{th}$ ed., vol. 2004, pp. 678-804.
Jagadeesh, K.S., and Siddaramaiah, Differential Scanning Calorimetry Cure Studies on the Effect of Addition of Epoxy Diluents to Tetrafunctional Epoxy Resins, Journal of Applied Polymer Science, vol. 40, pp. 1281-1288 (1990), John Wiley & Sons, Inc.

* cited by examiner

Primary Examiner — Michael J Feely

(57) ABSTRACT

The invention pertains to a printing form and a process for preparing the printing form from a solvent-free curable composition that includes, in prescribed relative amounts, an epoxy novolac resin; a bisphenol-A epoxy resin or a bisphenol-F epoxy resin; a monofunctional reactive diluent; a multifunctional reactive diluent; and a stoichiometric amount of an amine curing agent. The ratio of the epoxy novolac resin to the bisphenol epoxy resin is 1:3 to 3:1 by weight. The process includes applying the curable composition to a supporting substrate to form a layer, curing the layer at one or more temperatures in a temperature range, and engraving to form at least one cell in the cured layer. The process prepares printing forms, particularly gravure printing forms, having a cured resin composition layer that is engravable, resistant to solvent inks and to mechanical wear, and capable of printing gravure-quality images.

22 Claims, No Drawings

PRINTING FORM AND PROCESS FOR PREPARING THE PRINTING FORM WITH CURABLE COMPOSITION HAVING SOLVENT-FREE EPOXY RESIN

CROSS-REFERENCE TO RELATED APPLICATION

This application claims priority under 35 U.S.C. §119 from U.S. Provisional Application Ser. No. 61/578,322 (filed Dec. 21, 2011), the disclosure of which is incorporated by reference herein for all purposes as if fully set forth.

BACKGROUND OF THE INVENTION

1. Field of the Invention

This invention pertains to a printing form and a process for preparing a printing form, and in particular, a process for preparing a gravure printing form in which one or more conventional metal layers are replaced by specified solvent-free epoxy resins.

2. Description of Related Art

Gravure printing is a method of printing in which the printing form prints from an image area, where the image area is depressed and consists of small recessed cups or wells to contain the ink or printing material, and the non-image area is the surface of the form. A gravure cylinder, for example, is essentially made by electroplating a copper layer onto a base roller, and then engraving the image composed of the small recessed cells or wells digitally by a diamond stylus or laser etching machine. The cylinder with engraved cells is then overplated with a very thin layer of chrome to impart durability during the printing process. Consequently, gravure printing forms are expensive and require considerable time and material to produce.

Replacing the electroplated copper and chrome layers with a polymer-based composition has been explored, for example, by Bressler at al. (U.S. Pat. No. 5,694,852), Campbell and Belser (U.S. Patent Publication 2004/0221756), and Kellner and Sahl (UK Patent Application GB 2,071,574). However, a combination of several process and property requirements must be met for gravure printing forms having a polymer-based composition to succeed. For an economical process, a polymer-based coating needs to be applied to the cylinder easily ("coatability") and cured reasonably rapidly ("curability"), allowing a high-quality surface layer to be produced to the strict tolerances required for gravure engraving and printing with a minimal requirement for grinding and polishing. The surface layer needs to have a level of hardness that produces well defined print cell structure when engraved, without significant chipping or breaking ("engravability"). The surface layer also needs to possess excellent resistance to the solvents used in gravure printing inks and cleaning solutions ("durability-solvent resistance"). Also, the surface layer needs to resist the mechanical wear ("durability-mechanical wear") encountered during the printing process. e.g., wear from the scraping of the doctor blade, wear from any abrasive particles that may be in the ink, and wear from the surface onto which the image is printed. Further, in order for gravure printing forms having a polymer-based composition to replace conventional metal-covered gravure printing forms, the polymer-based printing forms should be capable of relatively long print runs and provide a consistent printed image for a minimum of 200,000 impressions.

It is also desirable to minimize, or avoid entirely, generation of environmentally unfriendly volatile organic compounds.

As a consequence, there remains a need to identify specific compositions that can be used to produce, in an economical and environmentally-friendly manner, a printing form having a surface layer that exhibits the necessary combination of coatability, curability, engravability, solvent resistance, mechanical wear resistance, and print quality.

SUMMARY OF THE INVENTION

The present invention provides a process for preparing a printing form that includes providing a solvent free composition comprising i) an epoxy novolac resin, ii) a bisphenol-A epoxy resin or of a bisphenol-F epoxy resin, iii) a monofunctional reactive diluent, iv) a multifunctional reactive diluent, and v) a stoichiometric amount of a multifunctional amine curing agent, wherein i) and ii) together are at least about 70 wt % of i), ii), iii), and iv) together; and the ratio of 0 to ii) is about 1:3 to about 3:1 by weight. The process includes a) applying the composition onto a supporting substrate, thereby forming a layer; b) curing the layer at one or more temperatures in a range of room temperature to about 250° C.; and c) engraving at least one cell in the layer resulting from the previous step.

In accordance with another aspect of this invention there is provided a process for gravure printing with a printing form including a) preparing the printing form according to the process described above; b) applying an ink to the at least one cell; and c) transferring ink from the cell to a printable substrate, wherein the cured layer swells ≤12% based on weight of the layer.

In accordance with another aspect of this invention there is provided a printing form including a continuous print surface adjacent to a supporting substrate, wherein the continuous print surface is a cured epoxy composition prepared from a solvent-free curable composition comprising i) an epoxy novolac resin having a softening point less than about 60° C., ii) a bisphenol-A epoxy resin or a bisphenol-F epoxy resin having a softening point less than about 60° C., iii) a monofunctional reactive diluent, iv) a multifunctional reactive diluent, and v) a stoichiometric amount of a multifunctional amine curing agent, wherein i) and ii) together are at least about 70 wt % of i), ii), iii), and iv) together; the ratio of i) to ii) is about 1:3 to about 3:1 by weight; and the ratio of iii) to iv) is about 4:1 to about 1:4 by weight.

DESCRIPTION OF THE PREFERRED EMBODIMENTS

In the context of this disclosure, a number of terms shall be utilized.

The term "epoxy resin" means uncross-linked monomers or oligomers containing epoxy groups.

The term "epoxy novolac resin" means any of a group of epoxy resins created by the reaction of epichlorohydrin, having the following structure

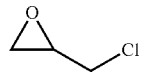

and novolac. The term "novolac" refers to any of the phenol-formaldehyde resins made with an excess of phenol in the reaction, and to any of the cresol-formaldehyde resins made with an excess of cresol in the reaction.

The term "bisphenol-A epoxy resin" means any of a group of glycidyl ether derivatives of bisphenol A,

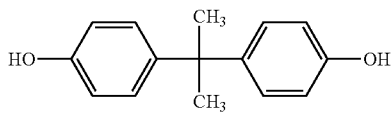 [SMILES: CC(C)(c1ccc(O)cc1)c1ccc(O)cc1]

prepared by reaction of bisphenol A with epichlorohydrin.

The term "bisphenol-F epoxy resin" means any of a group of glycidyl ether derivatives of bisphenol F, prepared by reaction of bisphenol F, i.e., a mixture of p, p', o, p', and o, o' isomers of bis(hydroxyphenyl)methane,

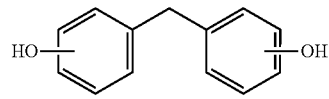

with epichlorohydrin.

The term "epoxy reactive diluent" refers to low viscosity epoxies that are used to modify the viscosity and other properties, such as, wetting and impregnation, of an epoxy composition that is to be cured. Herein, the term "diluent" or "reactive diluent" may be used for brevity in place of "epoxy reactive diluent."

The term "epoxy/diluent component" refers to the mixture of epoxy resins and reactive diluents in the curable composition.

The term "solvent" refers to a nonreactive component of a composition that reduces the viscosity of the composition and has a volatility such that it is removed under the conditions (such as temperature) at which the composition is processed.

The term "solvent-free" refers to a composition that does not contain a solvent, or substantially does not contain a solvent, as defined above. Compositions that substantially do not contain a solvent can contain trace amount or ≤1% by weight of solvent in some embodiments, and less than 0.5% of solvent in other embodiments.

The term "gravure printing" means a process in which an image is created by engraving or etching one or more depressions in the surface of a printing form, the engraved or etched area is filled with ink, then the printing form transfers the ink image to a substrate, such as paper or another material. An individual engraved or etched depression is referred to as a "cell."

The term "relief printing" means a process in which a relief surface is created by engraving or etching one or more depressions in the surface of a printing form in which the image area is raised and the non-image area is the depressions, ink is applied to the raised area, and then the printing form transfers the ink image to a substrate, such as paper or another material. An individual engraved or etched depression can be referred to as a "cell." Letterpress printing is one type of relief printing.

The term "printing form" means an object (e.g., in the form of a cylinder, block, or plate) used to apply ink onto a surface for printing.

The term "room temperature" or, equivalently "ambient temperature," has its ordinary meaning as known to those skilled in the art and can include temperatures within the range of about 16° C. (60° F.) to about 32° C. (90° F.).

The term "primary amine" means any of a class of organic compounds containing —NH$_2$ functional groups.

The term "secondary amine" means any of a class of organic compounds containing —NH— functional groups.

The term "solvent ink" means an ink that includes an organic solvent, typically the organic solvent is volatile, in contrast to water-based inks.

The term "curing" refers to hardening of a polymer material or resin by cross-linking of polymer chains, brought about by chemical additives, heat, ultraviolet radiation, or an electron beam. Hardening occurs primarily by crosslinking of the polymer chains. Other interactions in the polymer material or resin, such as branching and linear chain extension, can also occur in relatively small degree compared to crosslinking of the polymer chains.

The term "accelerator" means a catalyst used in conjunction with a curing agent.

The term "amine hydrogen equivalent weight" (AHEW) means the molecular weight of the amine-group-containing molecule divided by the number of amine hydrogens in the molecule. For example, triethylenetetraamine ("TETA") has a molecular weight of 146 and 6 amine hydrogens, so its AHEW is 146/6=24 g/equiv. If the compound is an adduct of an amine and, e.g., an epoxy, the effective AHEW is based on the amine component.

The term "epoxide equivalent weight" (EEW) means the weight in grams that contains 1 gram equivalent of epoxide.

The term "nanoparticle" means a particle having at least one dimension less than about 500 nm.

The term "molecular weight" is the weight average molecular weight, unless described otherwise in the specification.

The term "softening point" refers to a Mettler softening point, which is measured according to ASTM D-3104. It is usually reported as a temperature range. As used herein, the phrase "having a softening point less than X" means that the upper limit of the temperature range determined by ASTM D-3104 is less than about X. A material that is a liquid at a specified temperature Y has a softening point less than Y.

The present invention is a process for preparing a printing form from a curable composition, and particularly a process for preparing a gravure printing form from a curable composition. The curable composition comprises i) an epoxy novolac resin, ii) a bisphenol-A epoxy resin or a bisphenol-F epoxy resin, iii) a monofunctional reactive diluent, iv) a multifunctional reactive diluent, and v) a stoichiometric amount of a multifunctional amine curing agent, wherein i) and ii) together are at least about 70 wt % of i), ii), iii), and iv) together; and the ratio of i) to ii) is about 1:3 to about 3:1 by weight. In most embodiments of the curable composition i) and ii) together are about 70 to about 95 wt % of i), ii), iii), and iv) together, and the ratio of iii) to iv) is about 4:1 to about 1:4 by weight. The claimed process facilitates the preparation of a printing form in considerably less time, at reduced cost, and in a more environmentally-sound manner than conventional printing forms having one or more metal layers for gravure printing. The curable composition is solvent-free which eliminates or reduces the emission of volatile organic compounds (VOCs) when heated during application to form a layer onto a supporting substrate and during thermal curing of the layer.

Surprisingly and unexpectedly, the claimed process prepares a printing form from the particular curable composition that is capable of meeting several of the property requirements for successful performance comparable to conventional gravure printing forms. Surprisingly, the particular curable composition has good coatability without the need for a solvent as the composition can be applied easily to form a layer on a supporting substrate that is relatively uniform and needs only minimal grinding or polishing. The application of the solvent-free curable composition to form a layer is a more robust process: allowing greater latitude in application and curing temperature and in the coating method; reducing or eliminating defects in the layer that could be caused by VOC emissions; and, avoiding flashing of the solvent. The solvent-free composition does not contain a solvent or does not substantially contain a solvent. Solvent-free compositions include compositions that do not contain a solvent, and compositions that contain trace amount or less than about 1% by weight of solvent (based on the total weight of the components) in some embodiments, and less than about 0.5% of solvent in other embodiments. The solvent-free composition can contain some small amount, i.e., 1% by weight or less, but it is expected that this does not influence the use of the composition or detract from the advantages expressed. Since solvents are often used in the production of chemicals, the composition can contain residual solvent that originates with the one or more of the components of the composition. Also a solvent or solvents may be used to facilitate the incorporation of one or more components into the present composition, but some residual solvent's may remain even though the solvent is stripped off before application of the present composition to the supporting substrate. Even with the presence of 1% or less solvent, the present composition is considered solvent-free as solvent is not actively added to the composition, and any solvent used to incorporate components is actively removed from the composition prior to use.

The present curable composition has good curability as the composition can be cured reasonably rapidly in less than 6 hours, and in most embodiments in less than 4 hours. Good coatability and curability allow for a high quality coating of the epoxy resin to be produced within strict tolerances needed for gravure engraving and printing with minimal after treatments. Additionally, since the high quality coating and curing can be rapidly accomplished, the claimed process is economical for time and cost such that it can compete with conventional metal-plating processes for gravure printing cylinders.

After the layer of the particular curable composition is cured, the layer provides the desired balance between engravability and mechanical wear resistance. The cured layer exhibits a level of hardness that produces well-defined print cell structures when engraved yet resists wear during printing from contact with the doctor blade and the printed substrate, and abrasive particles that may be in the ink. The cured layer of the particular composition can be engraved to have cell density at resolution at least up to 200 lines per inch, with minimal or no break out of wall between adjacent cells. And yet, the cured layer of the particular composition is capable of printing for relatively long print runs, i.e., over 100,000 impressions and preferably more, with wear reduction of the cell area of no more than 10%, and in most embodiments wear of less than 5%. Additionally, the cured layer of the particular composition has excellent resistance to solvents used in printing inks and cleaning solutions, such that high quality printing can be maintained for the relatively long print runs. Furthermore, because the curable composition is itself solvent-free, environmentally unfriendly volatile organic compounds are not generated.

The epoxy novolac resin that is created by the reaction of epichlorohydrin and novolac has a phenolic backbone having pendant epoxide groups. The novolac resin can be prepared from unsubstituted phenols and from substituted phenols, such as cresol. Epoxy novolac resins also encompass epoxy cresol novolac resins, wherein the cresol forms the phenolic backbone of the epoxy novolac resin.

In most embodiments the curable composition includes an epoxy novolac resin that has a softening point less than about 60° C. The application of the solvent-free curable composition to a supporting substrate at room temperature is aided by the epoxy novolac resin having a softening point less than about 60° C. In embodiments in which the curable composition includes more than one epoxy novolac resin, it is not necessary that all the epoxy novolac resins have a softening point than about 60° C. In other embodiments in which the curable composition includes an epoxy novolac resin in relatively small amount (compared to the bisphenol epoxy resin) the epoxy novolac resin can have a softening point equal to or greater than about 60° C., and application of the composition may still be able to occur at room temperature. In other embodiments, if the curable composition is applied to the supporting substrate that is at a temperature above room temperature, the epoxy novolac resin can have a higher softening point, that is, a softening point equal to or greater than about 60° C.

The epoxy novolac resins used in the processes described herein are characterized by an epoxide equivalent weight (EEW) between and optionally including any two of the following values: 156, 160, 170, 180, 190, 200, 210, 220, 230, 240, 250, 260, 270, 280, 290, and 300 g/equiv. In one embodiment, the EEW is between about 156 and about 230 g/equiv. If the epoxide equivalent weight is above about 300, it is contemplated that the chemical or solvent resistance of the composition of the epoxy novolac resin would deteriorate.

In some embodiments, the curable composition comprises epoxy-novolac resins having a molecular weight between and optionally including 312 and 1200 any two of the following values: 312, 400, 600, 800, 1000, 1200, 1500, 1800, 2100, 2400, 2700, and 3000. In one embodiment the molecular weight of the epoxy novolac resin is between about 312 and about 1000. In most embodiments, the epoxy novolac resins have an average functionality greater than 2.0, which leads to higher cross-linking density upon curing. Epoxy novolac resins with higher crosslinking density have good toughness and chemical resistance, which leads to suitable wear and impact resistance and solvent resistance for use as a printing form compared to other epoxy resin compositions, such as DGEBPA and DGEBPF.

In some embodiments, the epoxy novolac resins include resins of the following formula (I)

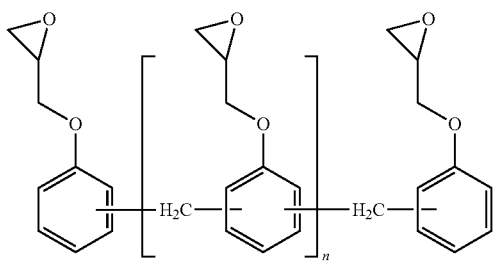

I where n can range from about 0.1 to about 5, including fractions therebetween. In some embodiments, n ranges from about 0.2 to about 2.0. Examples of embodiments of the epoxy novolac resins of formula (I) are D.E.N.™ 431, D.E.N.™ 438, and D.E.N.™ 439 (available from The Dow Chemical Company, Midland, Mich., U.S.A.); and EPON™ Resin 160, EPON™ Resin 161 (available from Momentive Specialty Chemicals, Inc., formerly Hexion Specialty Chemicals, part of Momentive Performance Materials Holdings, Inc., Columbus, Ohio, U.S.A).

In some other embodiments the epoxy novolac resins include epoxy cresol novolac resins of the following formula (II)

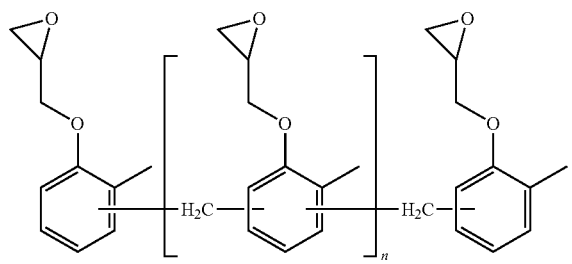

II where n can range from about 0.1 to about 4, including fractions therebetween. In some embodiments, n ranges from about 0.2 to about 3. An example of the epoxy novolac resin of formula (II) is Araldite® ECN 9511 (available from Huntsman).

In yet other embodiments the epoxy novolac resins include epoxy novolac resins of the following formula (III)

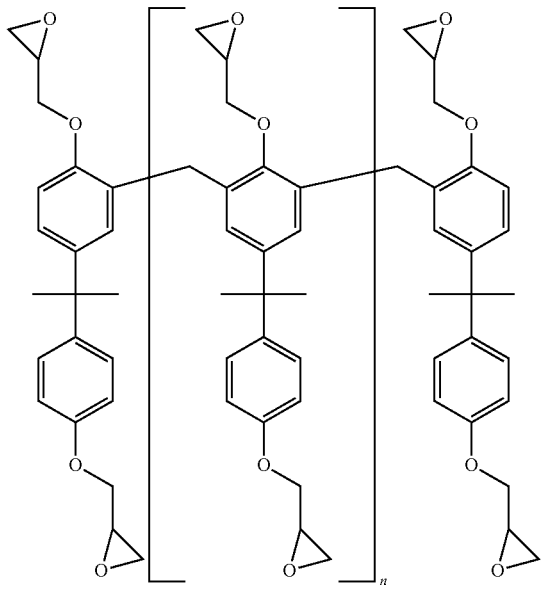

III where n can range from about 0 to about 4, including fractions therebetween. In some embodiments, n ranges from about 0 to about 2. An example of an epoxy novolac resin of formula (III) is EPON™ Resin SU-2.5.

A second epoxy resin is blended with the epoxy novolac in the curable composition. The ratio of the epoxy novolac resin to the second epoxy resin is from about 1:3 to about 3:1 by weight and can be between and optionally include any two of the following values: 1.0:3.0, 1.2:3.0, 1.4:3.0, 1.6:3.0, 1.8:3.0, 2.0:3.0, 2.2:3.0, 2.4:3.0, 2.6:3.0, 2.8:3.0, 3.0:3.0, 3.0:2.8, 3.0:2.6, 3.0:2.4, 3.0:2.2, 3.0:2.0, 3.0:1.8, 3.0:1.6, 3.0:1.4, 3.0:1.2, and 3.0:1.0. The second epoxy resin is bisphenol A diglycidyl ether, "DGEBPA" and its oligomers, represented by formula (IV)

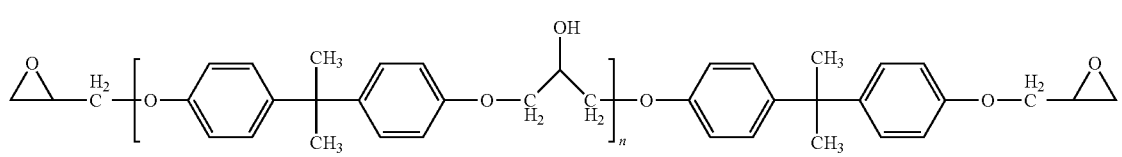

IV or bisphenol F diglycidyl ether, "DGEBFA," and its oligomers, represented by formula (V)

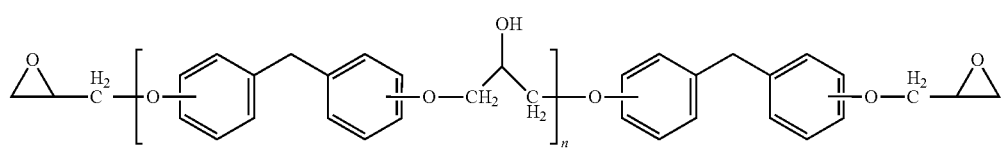

V where n can be 0 to about 4. For DGEBPA and DGEBFA, n is 0. The molecular weight of oligomers of DGEBPA and DGEBFA can be up to approximately 1200 g/mol.

The epoxy resins of formulas (I) through (V) each contain a distribution of oligomers, i.e., "-mer" units, and as such, n represents a number of -mer units in the epoxy novolac compounds, per the range of values of n for formula (I) through (V) recited above. As used herein, the term "-mer" or "-mer units", encompasses epoxy novolac oligomeric compounds having more than one repeating unit that includes dimers, trimers, tetramers, pentamers, hexamers, and heptamers. In one embodiment, the distribution of -mer units in an epoxy resin includes a mixture of several or all possible (i.e., dimers through heptamers), such that n represents an average number of -mer units in the resin. In other embodiments, the distribution of -mer units in an epoxy novolac resin includes a mixture of several or all possible (i.e., dimers through heptamers), such that n represents the predominant species of oligomers in the mixture. As an example, the epoxy novolac of formula (I) wherein n equals 2.4, is a mixture of oligomers (i.e., a mixture of dimers, trimers, tetramers, pentamers, and hexamers, and perhaps heptamers), where the predominant species is tetramers and pentamers. For the epoxy novolac resins represented by formulas (I), (II), and (III), n can be between and optionally include any two of the following values: 0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, per the range for n that is recited above. For the bisphenol A and bisphenol F resins represented by formulas (Iv) and (V) respectively, n can be between and optionally include any two of the following values: 0, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, and 16.5.

In most embodiments the curable composition includes a bisphenol-A epoxy resin that has a softening point less than about 60° C. or a bisphenol-F epoxy resin that has a softening point less than about 60° C. The application of the solvent-free curable composition to a supporting substrate at room temperature is aided by bisphenol-A or bisphenol-F epoxy resin having a softening point less than about 60° C. In embodiments in which the curable composition includes more than one bisphenol epoxy resin, it is not necessary that all the bisphenol epoxy resins have a softening point than about 60° C. In other embodiments in which the curable composition includes a bisphenol epoxy resin in relatively small amount (compared to the epoxy novolac resin) the bisphenol epoxy resin can have a softening point equal to or greater than about 60° C., and application of the composition may still be able to occur at room temperature. In other embodiments, if the curable composition is applied to the supporting substrate that is at a temperature above room temperature, the bisphenol-A or bisphenol-F can have a higher softening point, that is, a softening point equal to or greater than about 60° C.

Epoxy novolac resins generally have a high degree of epoxy functionality crosslinking that can provide suitable mechanical properties as a layer, but tend to be solid or liquid with high viscosity. At the same conditions, bisphenol epoxy resins generally have lower viscosity than the epoxy novolac resins. The combination of the epoxy novolac resin and the bisphenol epoxy resin provides the curable composition with a balance of the advantage of mechanical properties in end-use with the advantage of adjusting viscosity of the epoxy resin composition, with limited addition of a mixture of epoxy reactive diluents, to facilitate its application onto the supporting substrate.

Curing agents used in the processes described herein are primary amines and secondary amines, and thus are referred to herein as amine curing agents. Amine curing agents are primarily suitable for the present process because they increase the cure speed of the curable composition compared to other possible curing agents such as acids and/or anhydrides, and are capable of curing the composition at moderate temperatures, e.g., room temperature to about 150° C. In most embodiments, amine curing agents are characterized by an amine hydrogen equivalent weight (AHEW) of less than or equal to about 40 g/equivalent. In one embodiment, the amine hydrogen equivalent weight is between and optionally including 20 and 40 g/equivalent. In some embodiments, the amine hydrogen equivalent weight is between and optionally including any two of the following values: 20, 25, 30, 35, and 40 g/equivalent. The amine curing agent can also be provided in the form of an adduct of an amine curing agent with one or more of the epoxy resins or reactive diluents of the instant invention. The amine curing agent having amine hydrogen equivalent weight of less than or equal to about 40 g/equivalents aids in providing a cured layer of the composition with a sufficient degree of solvent resistance such that print quality can be maintained for print run lengths of at least 100,000 impressions or more. Solvent resistance of the resin-based layer on the printing form is particularly important since many inks used in gravure printing are solvent-based inks, and attack by solvents of the resin-based layer can cause the layer to swell and thereby detrimentally impact print quality and run length. Amine curing agents having an amine hydrogen equivalent weight (AHEW) of less than or equal to about 40 g/equivalent provides the curable composition with the broadest and most consistent solvent resistance to solvent-based inks. In some embodiments, the curable composition can include amine curing agents having an amine hydrogen equivalent weight greater than 40 g/equivalents, as the composition may still be useful in other aspects yet provide suitable solvent resistance to most solvent-based inks for gravure printing.

The amine curing agent is multifunctional; that is, it has 2 or more amino functionalities per molecule. The amines can be aliphatic amines (e.g., triethylenetetramine (TETA), diethylenetriamine (DETA), tetraethylenepentamine, 1,2-diaminocyclohexane); aromatic amines (e.g., m-phenylenediamine); or arylyl amines, which have cycloaliphatic or aromatic moieties from which the amine functional groups are separated by methylene groups —$CH_2$— (e.g., m-xylylene diamine and 1,3-bis(aminomethyl cyclohexane)). An extensive list of commercial amine curing agents is given in Table 15 on p. 730 of "Epoxy Resins," by Ha. Q. Pham and Maurice J. Marks in *Encyclopedia of Polymer Science and Technology*, 4th ed., Jacqueline I. Kroschwitz, exec. ed., John Wiley & Sons, Hoboken, N.J., 2004, pp. 678-804. Mixtures of amine curing agents can also be used. Ethyleneamine curing agents such as DETA or TETA, or adducts containing them, are particularly preferred, though certain other amines also work either by themselves or in combination with other amines, depending on the specific epoxy formulation. In some embodiments the curing agent is triethylenetetramine, diethylenetriamine, or tetraethylenepentamine. A "stoichiometric" quantity of amine curing agent is used; that is to say, the ratio of the curing agent amine hydrogens to the resin epoxy functionalities in the curable composition is from about 0.95:1.0 to about 1.1:1.0, on a mole-to-mole basis and can be between and optionally include any two of the following values: 0.95:1.0, 0.96:1.0, 0.97:1.0, 0.98:1.0, 0.99:1.0, 1.0:1.0, and 1.1:1.0 to about 1.1:1.0.

The epoxy resin mixture can be cured in the presence of the curing agent and an "accelerator," which is the term used in the art for a catalyst used in conjunction with a curing agent. Catalytic polymerizations of epoxy occur with a variety of Lewis bases and acids as well as salts and metal complexes. Epoxy curing reactions are described in *Epoxy Resins Chemistry and Technology*, Clayton A. May editor, $2^{nd}$ edition, Marcel Dekker, Inc, NY. Suitable accelerators include, but are not limited to, imidazoles, 2-ethyl-4-methyl imidazole, 2,4,6-tris(dimethylaminomethyl)phenol, and nonyl phenol.

A mixture of diluents is used to achieve desired viscosity of the curable composition while maintaining desired properties of the cured composition. Specifically, the curable composition used in the processes described herein contains a mixture of a monofunctional epoxy reactive diluent and a multifunctional epoxy reactive diluent. The epoxy reactive diluents are low viscosity epoxies that are used to modify the viscosity and other properties, such as, wetting and impregnation, of the epoxy composition that is to be cured. The viscosity of the epoxy reactive diluents is typically less than about 300 cp at room temperature. Examples of monofunctional diluents include without limitation: p-tertiarybutyl phenol glycidyl ether, cresyl glycidyl ether, 2-ethylhexyl glycidyl ether, $C_8$-$C_{14}$ glycidyl ether. Examples of difunctional diluents include, without limitation, 1,4-butanediol diglycidyl ether; neopentyl glycol diglycidyl ether; and cyclohexane dimethanol diglycidyl ether. An example of a trifunctional diluent is trimethylol propane triglycidyl ether.

In most embodiments in the mixture of diluents, the ratio of monofunctional reactive diluent to multifunctional reactive diluent is from about 4:1 to about 1:4 by weight. Particularly in embodiments if the total amount of diluents in the mixture of diluents is equal to or greater than about 10 wt % (based on the combined weight of the epoxy/diluent component), the ratio of monofunctional reactive diluent to multifunctional reactive diluent is from about 4:1 to about 1:4 by weight. If the total amount of diluents in the mixture of diluents is less than about 10 wt % (based on the combined weight of the epoxy/diluent component), the weight ratio of monofunctional diluent to multifunctional diluent is not particularly limited to about 4:1 to 1:4. The ratio of the monofunctional reactive diluent to the multifunctional reactive diluent can be between and optionally include any two of the following values: 1.0:4.0, 1.2:4.0, 1.4:4.0, 1.6:4.0, 1.8:4.0, 2.0:4.0, 2.2:4.0, 2.4:4.0, 2.6:4.0, 2.8:4.0, 3.0:4.0, 3.2:4.0, 3.4:4.0, 3.6:4.0, 3.8:4.0, 4.0:4.0, 4.0:3.8, 4.0:3.6, 4.0:3.4, 4.0:3.2, 4.0:3.0, 4.0:2.8, 4.0:2.6, 4.0:2.4, 4.0:2.2, 4.0:2.0, 4.0:1.8, 4.0:1.6, 4.0:1.4, 4.0:1.2, and 4.0:1.0. The mixture of diluents is used in large enough amounts that the curable composition is coatable on a cylinder, having a viscosity in the range of about 200 to about 3500 cp at the coating temperature; and yet in small enough amounts that the chemical resistance and other properties of the cured composition are not impaired, In one embodiment, the mixture of diluents is present in the curable composition in an amount from about 4 to about 30 wt %, based on the weight of the epoxy/diluent component (i.e., the combined weight of epoxy resins (i.e., epoxy novolac resin, and bisphenol-A epoxy resin or bisphenol-F epoxy resin) and diluents (i.e., the monofunctional reactive diluent and the multifunctional reactive diluent), and can be between and optionally include any two of the following values: 4, 5, 7.5, 10, 12.5, 15, 17.5, 20, 22.5, 25, 27.5, and 30 wt %.

In the curable compositions used in the processes described herein, the epoxy/diluent component is present at about 75 to about 95 wt % based on the combined weight of epoxy/diluent component and amine curing agent. In an embodiment, the epoxy/diluent component content can be between and optionally include any two of the following values: 75, 80, 85, 90, and 95 wt % based on the combined weight of epoxy/diluent component and amine curing agent. In the epoxy/diluent component, the epoxy novolac resin is present at about 17 to about 70 wt %, the bisphenol A epoxy resin or bisphenol F epoxy resin is present at about 17 to about 70 wt %, the monofunctional diluent is present at about 1 to about 24 wt %, and the multifunctional diluent is present at about 1 to about 24 wt %, based on the weight of the epoxy/diluent component. In an embodiment, the epoxy novolac resin content can be between and optionally include any two of the following values: 17, 20, 25, 30, 35, 40, 45, 50, 55, 60, 65, and 70 wt % based on the weight of the epoxy/diluent component. In an embodiment, the bisphenol-A epoxy resin or bisphenol-F epoxy resin content can be between and optionally include any two of the following values: 17, 20, 25, 30, 35, 40, 45, 50, 55, 60, 65, and 70 wt % based on the weight of the epoxy/diluent component. In an embodiment, the monofunctional diluent content can be between and optionally include any two of the following values: 1, 3, 5, 7, 10, 12, 14, 16, 18, 20, 22, and 24 wt % based on the weight of the epoxy/diluent component. In an embodiment, the multifunctional diluent content can be between and optionally include any two of the following values: 1, 3, 5, 7, 10, 12, 14, 16, 18, 20, 22, and 24 wt % based on the weight of the epoxy/diluent component.

Optionally, the curable composition can include up to about 30 wt % nanoparticles, i.e., particles having at least one dimension less than about 500 nm. In an embodiment, the value of the at least one dimension is between and optionally including any two of the following values: 1, 10, 50, 75, 100, 200, 300, 400, and 500 nm. In an embodiment, the value is between about 1 and about 100 nm. The nanoparticles can be present in an amount between and optionally including any two of the following values: 0, 0.1, 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30 wt % based on the combined weight of the components in the curable composition, and nanoparticles. The nanoparticles can provide hardness and modulus of the composition, which can lead to increased wear resistance and improved engravability of a cured layer of the composition. In one embodiment, the nanoparticles are present in an amount between about 0.1 and about 25 wt %; in some embodiments, the nanoparticles are present between about 0.1 to about 15 wt %; and in some other embodiments, are present in an amount between about 10 to 20 wt %, based on the combined weight of the components in the curable composition.

Optionally, the nanoparticles can be coated or subjected to a surface treatment with, for example, an organic onium species, to improve interaction between the nanoparticles and the resin.

Examples of suitable nanoparticles include, but are not limited to: aluminum oxides (e.g., alumina); silica (e.g., colloidal silica and fumed silica); zinc oxide; zirconium oxide; titanium oxide; magnesium oxides; tungsten oxides; tungsten carbides; silicon carbide; titanium carbide; boron nitrides; molybdenum disulfide; clays, e.g., laponite, bentonite, montmorillonite, hectorite, kaolinite, dickite, nacrite, halloysite, saponite, nontronite, beidellite, volhonskoite, sauconite, magadite, medmonite, kenyaite, vermiculite, serpentines, attapulgite, kulkeite, alletite, sepiolite, allophane, imogolite; carbon nanotubes; carbon black; carbon filaments; and mixtures thereof.

Optionally, the curable composition can include fillers as a solid lubricant to impart improved wear characteristics of the cured composition layer. Fillers include particles having at least one dimension greater than about 500 nm, and generally between about 500 nm to about 5 micron. Examples of fillers, include but are not limited to, tungsten carbides; silicon carbide; titanium carbide; boron nitrides; molybdenum disulfide; graphites; poly(tetrafluoroethylene); and mixtures thereof. The curable composition can include fillers at up to and including about 50 wt %, based on the combined weight of all the components in the composition. The curable composition can include fillers up to about 40 wt % in some embodiments; at up to about 30 wt % in some other embodiments; and up to about 20 wt % in other embodiments. The filler can be present in an amount between and optionally including any two of the following values: 0, 1, 5, 10, 15, 20, 25, 30, 35, 40, 45, and 50 wt % based on the combined weight of the components in the curable composition and filler. Optionally, the curable composition can include resin modifiers. Resin modifiers can be used to increase crosslinking density and/or stabilize the crosslinked network, which can provide improved end-use characteristics, such as increased solvent resistance, wear resistance, and/or improve engravability of the cured layer of the composition. Resin modifiers include, but are not limited to, acrylate monoesters of alcohols and polyols; acrylate polyesters of alcohols and polyols; methacrylate monoesters of alcohols and polyols; and methacrylate polyesters of alcohols and polyols; where the alcohols and the polyols suitable include alkanols, alkylene glycols, trimethylol propane, ethoxylated trimethylol propane, pentaerythritol, and polyacrylol oligomers. A combination of monofunctional and multifunctional acrylates or methacrylates can be used. The curable composition can include resin modifiers at up to about 10 wt %, based on the combined weight of all the components in the composition.

The curable composition optionally can include additives to the epoxy resin, such as flexibilizing components, non-reactive (and non-volatile at curing conditions) diluents (such as, dibutyl phthalate), surfactants, dispersants, dyes, pigments, and wetting and leveling additives for coating uniformity and appearance. Epoxy can be flexibilized as described in *Epoxy Resins Chemistry and Technology*, Clayton A. May editor, 2$^{nd}$ edition, Marcel Dekker, Inc, NY. Suitable flexibilizing components include, but are not limited to, polyamides, carboxylated polymers, fatty diamines, polyglycol diepoxides, and polyurethane amines (including polyetherurethane amines). In some embodiments, polyurethane amine or polyetherurethane amine (e.g., Aradur® 70BD, available from Huntsman International LLC, Salt Lake City, Utah, U.S.A.) can be included in the curable composition as a flexibilizing component.

The curable composition includes at least the epoxy/diluent component and the multifunctional amine curing agent as described above. In some embodiments, the curable composition can include or can consist essentially of the epoxy/diluent component, the amine curing agent and a catalyst. In other embodiments, the curable composition can include or can consist essentially of the epoxy/diluent component, the amine curing agent, the catalyst, and nanoparticles. In yet other embodiments, the curable composition can include or can consist essentially of epoxy/diluent component, the amine curing agent, the catalyst, and filler. In yet some other embodiments, the curable composition can include or can consist essentially of epoxy/diluent component, the amine curing agent, the catalyst, nanoparticles, and filler. In some embodiments, the curable compositions include the epoxy resin/diluent component present at about 40 to 90 wt %, the amine curing agent at about 4 to 25 wt %, the mixture of diluents at about 3 to 30 wt %, and the nanoparticles at about 0 to 30% based on the combined weight of epoxy resins, amine curing agent, mixture of diluents, and nanoparticles. In some embodiments, the epoxy/diluent component is present at a wt % between and optionally including any two of the following values: 40, 45, 50, 55, 60, 65, 70, 75, 80, 85, and 90 wt % based on the combined weight of epoxy resins, amine curing agent, mixture of diluents, and nanoparticles. In some embodiments, the amine curing agent is present at a wt % between and optionally including any two of the following values: 4, 7, 10, 12, 15, 17, 20, 22, and 25 wt % based on the combined weight of epoxy resins, amine curing agent, mixture of diluents, and nanoparticles. In some embodiments, the mixture of diluents is present at a wt % between and optionally including any two of the following values: 3, 7, 10, 12, 15, 17, 20, 22, 25, 27, and 30 wt % based on the combined weight of epoxy resins, amine curing agent, mixture of diluents, and nanoparticles. In some embodiments, the nanoparticles can be present at a wt % between and optionally including any two of the following values: 0, 4, 7, 10, 12, 15, 17, 20, 22, 25, 27, and 30 wt % based on the combined weight of epoxy resins, amine curing agent, mixture of diluents, and nanoparticles. In some embodiments, the filler can be present at a wt % between and optionally including any two of the following values: 0, 1, 5, 10, 15, 20, 25, 30, 35, 40, 45, and 50 wt % based on the combined weight of epoxy resins, amine curing agent, mixture of diluents, and filler.

In one embodiment, the curable composition used for the printing form can include or can consist essentially of a) an epoxy novolac resin having an epoxide equivalent weight of about 172 to about 179 g/equivalent: b) a bisphenol F epoxy resin having an epoxide equivalent weight of 163 to 172 g/equivalent; c) diethylenetriamine; d) a mixture of p-tert-butylphenyl glycidyl ether plus 1,4-butanediol diglycidyl ether in a weight ratio of about 3:1, respectively; wherein the weight ratio of the epoxy novolac resin to the bisphenol F epoxy resin is about 6:7 (normalized ratio of 1:1.17); and mixture d) of p-tert-butylphenyl glycidyl ether plus 1,4-butanediol diglycidyl ether, is about 15 to 20 wt % of the epoxy/diluent component a)+b)+d). In an embodiment, the curable composition further includes up to about 30 wt % nanoparticles; in another embodiment, up to 20 wt % nanoparticles, such as alumina nanoparticles or silica nanoparticles.

In one embodiment, the present process for preparing a printing form includes a) providing a solvent-free curable composition comprising i) an epoxy novolac resin; ii) a bisphenol-A epoxy resin or a bisphenol-F epoxy resin; iii) a monofunctional reactive diluent; iv) a multifunctional reactive diluent; and, v) a stoichiometric amount of a multifunctional amine curing agent; wherein i) and ii) together are at least 70 wt % of i), ii), iii), and iv) together; and the ratio of i) to ii) is 1:3 to 3:1 by weight; b) applying the composition onto a supporting substrate, thereby forming a layer; c) curing the layer at one or more temperatures in a range of room temperature to 250° C.; and d) engraving at least one cell in the layer resulting from step c). In another embodiment, the present process for preparing a printing form includes applying the solvent-free curable composition as described above to form a layer on a supporting substrate; curing the layer at one or more temperatures in a range of room temperature to 250° C.; and engraving at least one cell in the layer resulting from the curing step.

The process of preparing a printing form includes applying the curable composition onto a supporting substrate, to form a layer of the curable composition. The composition can be applied to the supporting substrate by various means that are well known in the art. The method of the present invention is particularly applicable to the application of the curable composition as a liquid to a supporting substrate that can be used as a printing roll or print cylinder in a rotogravure printing process. The supporting substrate can also include a planar support sheet that is typically composed of a metal. The supporting substrate, e.g., printing roll or print cylinder, can be made of metal (e.g., aluminum or steel) or a polymeric material. Prior to the application of the curable composition to the supporting substrate, an exterior surface of the supporting substrate that receives the composition can be pretreated by means of a plasma or corona pretreatment to clean and/or alter the surface (i.e., lower the surface tension) of the supporting substrate for improved film or coating wetout and bonding strengths. Additionally or alternatively, a primer solution, such as an epoxy primer solution, can be applied to the exterior surface of the supporting substrate to improve adhesion of the curable (and cured) composition to the supporting substrate.

The curable composition can be applied to the supporting substrate by any suitable method, including but not limited to, injection, pouring, liquid casting, jetting, immersion, spraying, vapor deposition, and coating. Examples of suitable methods of coating include spin coating, dip coating, slot coating, roller coating, extrusion coating, brush coating, ring coating, powder coating, and blade (e.g., doctor blade) coating, all as known in the art and described in, e.g., British Patent No. 1,544,748. In one embodiment the curable composition is applied by spraying the curable composition onto the surface of the supporting substrate, such as the printing roll or cylinder. Spraying can be accomplished through the use of a nozzle by techniques known in the art. In another embodiment, the curable composition is applied to the exterior surface of the supporting substrate by brush coating in a manner similar to that described in U.S. Pat. No. 4,007,680. In most embodiments, the curable composition is applied so as to form a continuous or seamless layer on a cylindrically-shaped supporting substrate, so as to provide a continuous print surface for the printing form (after curing and engraving). In some embodiments, application of the curable composition occurs at room temperature. In other embodiments, application of the curable composition occurs at a temperature above room temperature. The supporting substrate may be preheated to a temperature prior to application of the curable composition. The curable composition, as applied to the surface of the supporting substrate, forms a layer that has a thickness between about 2 to about 300 mils (50.8 to 7620 μm). Optionally the thickness of the curable composition layer includes any two of the following thicknesses: 2, 4, 8, 12, 16, 20, 50, 100, 150, 200, 250, and 300 mils (50.8, 102, 203, 305, 406, 508, 1270, 2540, 3810, 5080, 6350, and 7620 μm).

The process of preparing a printing form includes curing the layer at one or more temperatures in the range of room temperature to about 250° C. After the curable composition is applied to the supporting substrate, the layer of the composition is cured to harden on the supporting substrate, so that the layer is capable of being engraved. Hardening of the resin composition occurs by crosslinking of polymer chains of the epoxy novolac resin brought about by the reactive components in the composition, such as the amine curing agent, optional catalyst, and optional reactive diluent, with reactive groups in the resin. Curing can be performed at ambient temperature; however, for most embodiments of the present process, curing includes heating the layer of the composition. Curing can be accelerated by heating the layer of the composition at one or more temperatures in a range from above room temperature (i.e., ambient temperature) to about 250° C. The curable compositions described herein are cured thermally (i.e., by heating) in less than about 6 hours. In some embodiments, the layer of the curable compositions are cured thermally in less than 4 hours; in some other embodiments, the curable compositions are cured thermally in about 1 hour to about 2 hours. Times and temperatures will depend on the specific curable composition and are readily determined by one skilled in the art. One suitable method to determine if the layer of the curable composition is sufficiently cured is by conducting model studies of the composition based on end-use performance characteristics such as adhesion, wear resistance, and solvent resistance. More specifically, the temperature is in a range between and optionally including any two of the following values: 16, 30, 50, 70, 90, 110, 130, 150, 170, 190, 210, 230, and 250° C. Curing can be carried out at one temperature, or at two temperatures sequentially in the range, for example, 1 hour at 100° C. and then 4 hours at 160° C. In an embodiment, the layer of the composition is cured by heating at about 100° C. for 2 hours. In another embodiment, the layer of the composition is cured by heating at about 100° C. for 1 hour and then about 150 to 160° C. for about another 1 hour. In another embodiment, the layer of the composition is cured by heating at about 65° C. for 10 minutes and then about 110° C. for 20 minutes.

The cured layer of the curable composition (after application to the surface of the supporting substrate and cured) has a thickness that is from about 2 to about 300 mils (50.8 to 7620 μm). The thickness of the cured layer is between and optionally including any two of the following thicknesses: 2, 4, 8, 12, 16, 20, 50, 100, 150, 200, 250, and 300 mils (50.8, 102, 203, 305, 406, 508, 1270, 2540, 3810, 5080, 6350, and 7620 μm). Optionally, the cured layer can be ground and polished to desired thickness, cylindricity, and/or smoothness, prior to engraving as disclosed in U.S. Pat. No. 5,694,852. The smoothness of the cured layer can be reported as Rz value. In most embodiments, the smoothness of the cured layer has Rz value less than about 100 microinches; and, in other embodiments, the Rz value is less than about 80 microinches.

The process of preparing a printing form includes engraving at least one cell into the cured layer of the composition on the supporting substrate. After the curable composition is applied to the substrate and cured, engraving of the cured composition layer removes the hardened composition in depth to form a plurality of individual cells in the layer. For gravure printing, the plurality of individual cells in the layer are for carrying ink which transfers, in whole or part, during printing of the desired image. For relief printing, the surfaces raised above the plurality of individual cells in the layer carry the ink which transfers, in whole or part, during printing for the desired image. The engraving of the plurality of cells in the cured layer on the supporting substrate provides a printing form or, equivalently, an image carrier, having a printing surface that is capable of reproducing the desired image by printing onto a substrate. The engraving can be accomplished by any of various engraving methods known in the art. Examples include, but are not limited to, electromechanical engraving (e.g., with a diamond stylus) and laser engraving. These engraving methods can be part of an electronic engraving system. In one embodiment, engraving is carried out using a diamond stylus cutting tool. In another embodiment, direct laser non-contact engraving is used for the creation of the ink cells. The laser can be $CO_2$, YAG, or Diode type laser. The present process of preparing the printing form having a cured layer of the epoxy novolac composition is advantageous in that the cured layer can be engraved using conventional engraving equipment at standard or substantially standard conditions that are used to engrave copper layer for conventional gravure cylinders.

One or more pigments can be added to the curable composition in order to enhance its laser engravability. The pigment can be present in the laser engravable composition in an amount of from about 1 wt % to about 25 wt %, in one embodiment from about 3 wt % to about 20 wt %. Examples of such pigments include, but are not limited to, black silicic pigments (containing carbon-encapsulated silica particles), and carbon black.

Optionally, the engraved layer can be further treated by polishing to remove burrs, and/or by applying a coating of a fluoropolymeric composition over the engraved layer (i.e., overcoat) to improve the ink releasability of the printing form.

In some embodiments, the printing form is in the shape of a cylinder or plate. In some embodiments, the supporting substrate is metal or a polymer. In most embodiments, the printing form is suited for gravure printing. Gravure printing is a method of printing in which the printing form prints from an image area, where the image area is depressed and consists of small recessed cells (or wells) to contain the ink or printing material, and the non-image area is the surface of the form. In most embodiments, the printing surface is the cured layer of the epoxy composition that is engraved to form an ink receptive cell surface suitable for gravure printing. It is also contemplated that in some embodiments the printing form can be suited for relief printing, including use as a letterpress printing form. Relief printing is a method of printing in which the printing form prints from an image area, where the image area of the printing form is raised and the non-image area is depressed. For printing forms useful for relief printing, the engraving of at least one cell creates the non-image area that would not carry ink for printing the desired image, and the surface raised above the cell is the image area that carries ink for printing the desired image. In some embodiments the printing surface is a relief surface suitable for relief printing.

In a further embodiment, a printing form is provided that includes a continuous print surface adjacent to a supporting substrate, wherein the continuous print surface is a layer of a cured epoxy composition prepared from a curable composition that comprises i) an epoxy novolac resin having a softening point less than about 60° C., ii) a bisphenol-A epoxy resin or a bisphenol-F epoxy resin having a softening point less than about 60° C., iii) a monofunctional reactive diluent, iv) a multifunctional reactive diluent, and v) a stoichiometric amount of a multifunctional amine curing agent, wherein i) and ii) together are at least about 70 wt % of i), ii), and iv) together; the ratio of i) to ii) is about 1:3 to about 3:1 by weight; and the ratio of iii) to iv) is about 4:1 to about 1:4 by weight.

In another embodiment, a process is provided for printing with the printing form that was prepared as described above. In some embodiments, the process for printing further includes applying an ink, typically a solvent ink, to the at least one cell that has been engraved into the cured layer of the prepared printing form, and transferring ink from the cell to a printable substrate. In other embodiments, the process for printing further includes applying an ink to at least a surface above the cell that has been engraved into the cured layer of the prepared printing form, and transferring ink from the raised surface to a printable substrate. Suitable solvent inks include those based on organic solvents such as, without limitation, alcohols, hydrocarbons (e.g., toluene, heptane) acetates (e.g., ethyl acetate), and ketones (e.g., methyl ethyl ketone).

When the cured layer is not adequately solvent resistant, absorbing solvent from the solvent ink can cause the cured layer to swell excessively. Swelling excessively is detrimental to print quality and to the durability of the image carrier. The amount of swelling in terms of cured layer weight gain in the process described herein is less than about 10 wt %. In some embodiments, the amount of swelling of the cured layer is between 0 and about 5 wt %. This can be achieved in part through the choice of amine curing agent, i.e., by using an amine curing agent characterized by an amine hydrogen equivalent weight of less than or equal to about 40 g/equivalent. In addition, the structure of epoxy resin affects the amount of swell. For example, increased crosslinking of the polymer chains in the epoxy resin can lead to reduced swell, i.e., improved solvent resistance, of the cured layer.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

The meaning of abbreviations is as follows: "AHEW" means amine hydrogen equivalent weight; "AEP" means N-(2-aminoethyl)piperazine; "BCE" means benzyl glycidyl ether; "cm" means centimeter(s); "cp" means centipoise, a viscosity equal to 0.001 pascal second; "DACH" means 1,2-diaminocyclohexane (mixture of cis and trans); "DETA" means diethylene triamine, "EEW" means epoxide equivalent weight; "equiv" means equivalent(s); "g" means gram(s); "h" means hour(s); "IPDA" means isophorone diamine; "lpi" means lines per inch; "MEK" means methyl ethyl ketone; "mPa·s" means millipascal·second(s); "millitorr" means 0.001 mm of mercury, a pressure equal to 0.13332237 pascal; "mg" means milligrams; "mL" means milliliters; "mm" means millimeter(s); "mil" means 0.001 inch, a length equal to 0.0254 millimeters; "TETA" means triethylene tetraamine; "wt %" means weight percent(age); and "μm" means micrometer(s).

Methods

Viscosity

Epoxy resin compositions without curing agent were prepared and approximately 10 g was placed in the well of a Brookfield viscometer (Model LV) and equilibrated at 25° C. Viscosity in centipoise (1 cp=1 mPa·s) was determined as the ratio of shear stress to shear rate measured using spindle SC4-18 suspended in the coating composition. Spindle speed was chosen to give a % torque of 50 to 80%. The composition was considered to be coatable on a cylinder if its viscosity was in the range of 200 to 3500 cp at the coating temperature.

Solvent Resistance

Epoxy resin compositions were prepared and coated on an aluminum foil sheet support using a drawdown bar with a 15 to 20 mil (381-508 μm) gap to form a polymeric film (i.e., layer) on the support. The polymeric film samples were cured according to specifications in the Example, and peeled from the support. Film fragments (typically 50-100 mg) were weighed into jars containing 10-20 mL of specified solvent. The film fragments were immersed for one week (i.e., 7 days), then blotted dry and weighed. The wt % change is calculated as:

$$100*[\text{weight}(7\text{ day}) - \text{weight}(\text{initial})] / \text{weight}(\text{initial}).$$

The composition had good solvent resistance if, after 7 days in the solvent, the wt % change of the fragments was less than 12%.

Engravability

Epoxy resin compositions were prepared, coated onto a cylinder, cured and engraved as indicated in the Example. A cured resin sample was deemed to have good engravability if engraving of the sample to create cells at 170 to 200 lines per inch could be achieved with less than 15% breakout. Engraved image resolution of 170 to 200 fines per inch corresponds to a cell width of about 115 to 140 μm and a width of a cell wall of less than 25 μm. A breakout is defined herein as a defect in which a wall adjacent to two cells has a break in it, thereby producing a connection between the two cells. The engraved area was examined microscopically, and at least about 30-50 cells were examined to determine the breakout percentage.

Wear

An in-house wear test was established to mimic a typical gravure printing process. For the wear test, the (engraved) cylinder, which has a cured layer of the composition, was rotated, partially immersed in the ink tray, and was contacting a steel doctor blade once per revolution. The ink used for the test was Multiprint White ink from Del Val Ink and Color Inc. The cell area of the engraved cylinder was measured before and after 300,000 revolutions (unless otherwise noted) to monitor the extent of wear with a Hirox KH-7700 microscope. Wear is reported as a percent reduction in cell area. The cured layer was considered to have acceptable wear resistance if the reduction in cell area induced by the in-house tester was less than 10%.

Print Quality

Print quality was determined for a long print run, i.e., greater than 100,000 impressions, and is reported in terms of number of impressions until the print quality (considering characteristics such as sharpness, smearing, etc.) was visually unacceptable.

Softening Point

Manufacturers' reported softening points measured according to ASTM D-3104 were used when available. Otherwise, it was inferred that a material described as "liquid" at some temperature has a softening point lower than that temperature.

Materials

Araldite® DY-P (monoglycidylether of p-tert-butylphenol, CAS #3101-60-8), referred to herein as DY-P, was obtained from Huntsman Advanced Materials (The Woodlands, Tex., U.S.A.). EEW is 222-244 g/equiv. Its softening point is below 25° C. and its viscosity at 25° C. is 20-28 cp.

Araldite® DY-D (diglycidylether of 1,4-butanediol, CAS #2425-79-8), referred to herein as DY-D, was obtained from Huntsman Advanced Materials. EEW is 118-125 g/equiv. Its softening point is below 25° C. and its viscosity at 25° C. is 15-20 cp.

Araldite® DY-T (triglycidylether of trimethylolpropane, CAS #30499-70-8), referred to herein as DY-T, was obtained from Huntsman Advanced Materials. EEW is 111-143 g/equiv. Its softening point is below 25° C. and its viscosity at 25° C. is 100-300 cp.

Araldite® GY-285 (diglycidylether of bisphenol F, CAS #2095-03-6), referred to herein as GY-285, was obtained from Huntsman Advanced Materials. FEW is 163-172 g/equiv. Its softening point is below 25° C. and viscosity at 25° C. is 2000-3000 cp.

D.E.R™ 331 (diglycidylether of bisphenol A, CAS #25085-99-8), referred to herein as DER 331, was obtained from The Dow Chemical Company (Midland, Mich., U.S.A.). EEW is 182-192 g/equiv. Its crystalline melting point is about 42° C. and viscosity at 25° C., at which it exists as a supercooled liquid, is 11000-14000 cp.

D.E.N™ 431 (semi-solid epoxy novolac resin, CAS #28064-14-4), referred to herein as DEN 431, was obtained from The Dow Chemical Company (Midland, Mich., U.S.A.). FEW is 172-179 g/equiv. Its softening point is below 51.7° C. and viscosity at 51.7° is 1100-1700 cp; epoxy functionality is ±2.8.

Araldite® ECN 1273 (solid epoxy cresol novolac, CAS #29690-82-2), referred to herein as ECN 1273, was obtained from Huntsman Advanced Materials. EEW is 217-233 g/equiv.; softening point is 68 to 78° C.; epoxy functionality is ±4.8.

Benzyl glycidyl ether (CAS #2930-05-4), referred to herein as BGE, was obtained from Sigma-Aldrich Co. LLC (St. Louis, Mo., U.S.A.). EEW is 164 g/equiv.; viscosity at 25° C. is 5-8 cp.

Diethylene triamine (CAS #111-40-0), referred to herein as DETA, was obtained from Sigma-Aldrich Co. LLC (St. Louis, Mo., U.S.A.). AHEW is 20.6.

Triethylene tetramine (CAS #112-24-3), referred to herein as TETA, was obtained from MP Biomedicals LLC (Solon, Ohio, U.S.A.). AHEW is approximately 27.

1,2-Diaminocyclohexane, mixture of cis and trans (CAS #694-83-7), referred to herein as DACH, was obtained from Sigma-Aldrich Co. LLC. AHEW is 28.5.

Aradur™ 355 (modified cycloaliphatic polyamine adduct), was obtained from Huntsman Advanced Materials. AHEW of the adduct is 48.5. It includes DETA and DACH as its main amine components, which have an AHEW of 20.6 and 28.5, respectively. These have been reacted with an unspecified epoxy component to form an adduct.

Jeffamine™ T-403 (polyether triamine) was obtained from Huntsman Advanced Materials. AHEW is 79.

N-(2-Aminoethyl)piperazine (CAS #140-31-8), referred to herein as AEP, was obtained from Alfa-Aesar (Ward Hill, Mass., U.S.A.). AHEW is 43.1.

Isophorone diamine (CAS #2855.13-2), referred to herein as IPDA, was obtained from Sigma-Aldrich Co. LLC. AHEW is 42.6.

2,4,6-Tris(dimethylaminomethyl)phenol (CAS #90-72-2), referred to herein as DMP-30, was obtained from Sigma-Aldrich Co. LLC.

Methyl ethyl ketone (CAS #78-93-3), referred to herein as MEK, n-propyl acetate (CAS #109-60-4), referred to herein as propyl acetate, n-butyl acetate (CAS #123-86-4), referred to herein as butyl acetate, propylene glycol monomethyl ether (CAS #107-98-2), and methyl isobutyl ketone (CAS #108-10-1) were obtained from Sigma-Aldrich Co. LLC.

Toluene (CAS #108-88-3), ethyl acetate (CAS #141-78-6), and isopropanol (CAS #67-63-0) were obtained from EMD Chemicals, Inc. (Gibbstown, N.J., U.S.A.).

Exact amounts of epoxy/diluent components and amine curing agents are specified in the examples. Unless otherwise indicated, the formulations in the examples have a ratio of amine hydrogen to epoxy functionality in the range of approximately 0.95 to 1.10.

Example 1

This example demonstrates that an epoxy formulation consisting of 82.5% epoxy resin (epoxy novolac to bisphenol epoxy wt. ratio of 1:1.17) and 17.5% reactive diluent (monofunctional to multifunctional diluent wt. ratio of 3:1) cured with a stoichiometric amount of amine exhibits good performance as a printing form for gravure, including coatability, engravability, wear resistance, and solvent resistance.

4.594 g (13.1 wt % of the epoxy/diluent component) DY-P diluent and 1.539 g (4.4 wt %) DY-D diluent were combined in a flask. 13.285 g (38.0 wt %) DEN 431 epoxy novolac was added to the flask and the mixture was stirred briefly. 15.555 g (44.5 wt %) GY-285 bisphenol F epoxy was added and the mixture was placed in a 50° C. water bath and stirred until completely uniform. The mixture was degassed under vacuum (200-1000 millitorr) to remove gas bubbles.

4.135 g DETA amine was weighed out and degassed under house vacuum (approximately 150-200 torr). The amine was added to the epoxy mixture and stirred for approximately 10 minutes. The resulting coating solution was introduced into a metal syringe. It was then coated onto a metal cylinder that had been preheated to 45'C to obtain a coating 5.5-6 mils (140-152 µm) thick. The cylinder was coated using a brush technique with a combined syringe pump and translator mechanism to deliver material to obtain the desired coating thickness (6-10 mils, 152-254 µm). The coating was then cured at 100° C. for 1 h and then 150° C. for 1 h and allowed to cool to ambient temperature gradually. The composition coated and cured to form an excellent cured layer on the cylinder.

The cured layer on the cylinder was ground and polished mechanically to a uniform thickness of 5 mils (127 µm) and then engraved on an Ohio R-7100 series engraver at cell rate 3200 Hz, with vertical screen setting 274 cells/Rev, Horizontal screen setting 80 cells/length & single repeat setting 800¼ cells. The screen was 80 lines/cm, angle 60 deg, tone 100% & diamond face angle 120 deg. Engraving quality was excellent, with <1% broken cell walls at 100% cell density.

A wear test was performed on this cylinder coating according to the method described above. The reduction in cell area induced by the in-house tester was 2.7%, indicative of good wear resistance.

The same epoxy-amine formulation was prepared and cast onto aluminum foil placed over a steel plate using a drawdown knife with a 15 mil (381 µm) gap. The coated foil was cured at 100° C. for 1 h and then 150° C. for 1 h and allowed to cool. Film fragments peeled from the foil were tested for solvent resistance as described above. The solvents and mixed solvents chosen for testing are typical of those encountered in gravure inks. Results are presented in Table 1.

TABLE 1

| Solvent | % wt gain in 7 days in solvent |
|---|---|
| Methyl ethyl ketone (MEK) | 1.8% |
| Toluene | 0.4% |
| Ethyl acetate | 1.2% |
| Propyl acetate | 2.3% |
| Butyl acetate | 0% |
| Isopropanol | 0% |
| MEK/toluene/isopropanol (40:50:10) | 0.5% |
| MEK/n-propyl acetate/propylene glycol monomethyl ether/butyl acetate/methyl isobutyl ketone (20:25:20:15:20) | 0.2% |
| n-propyl acetate/ethyl acetate (50:50) | 0% |

The same epoxy formulation (without amine) was prepared and tested for viscosity as described above. Its viscosity at 25° C. was 1689 cp, a value that is consistent with its excellent observed coatability.

Based upon the results for the engravability, wear resistance, solvent resistance, and viscosity, it is expected that the curable composition of this Example should produce excellent quality prints and have a long print run life.

Comparative Examples A and B

These comparative examples demonstrate that, although formulations with 35% total diluent perform well in several respects, their poor solvent resistance prevents theft use as printing forms for gravure.

Two epoxy formulations were prepared in the same way as the formulation of Example 1, except with the following amounts of each ingredient (wt % is with reference to the epoxy/diluent component, i.e., the epoxy resins and diluent(s) combined): Comparative Example A—10.498 g (30.0 wt % of the epoxy/diluent component) DEN 431 epoxy novolac, 12.251 g (35.0 wt %) GY-285 bisphenol F epoxy, 9.193 g (26.3 wt %) DY-P diluent, 3.059 g (8.7 wt %) DY-D diluent, and 4.051 g DETA amine; Comparative Example B—10.503 g (30.0 wt %) DEN 431, 12.254 g (35.0 wt %) GY-285, 6.119 g (17.5 wt %) DY-P, 6.125 g (17.5 wt %) DY-D, and 4.276 g DETA.

These two formulations were coated onto sections of the same cylinder onto which Example 1 was coated, and by the same procedure. They were cured, ground to a uniform thickness of 5 mils (127 µm), then engraved, all according to the same procedure as for Example 1. The compositions coated and cured to form excellent cured layers on the cylinder. Engraving quality was very good, with 3% and 2% broken cell walls at 100% cell density for Comparative Examples A and B, respectively.

A wear test was performed on these cylinder coatings according to the method described above. The reduction in cell area induced by the in-house tester was 4.0% and 1.7%, respectively, for Comparative Examples A and B, indicative of good wear resistance.

Samples of these formulations were prepared for solvent resistance testing in MEK, ethyl acetate, and toluene in the same way as for Example 1 and tested as described above. Percent weight gain after 7 days in solvent was 25.3, 21.8, and 1.1 for Comparative Example A and 22.1, 17.5, and 2.5 for Comparative Example B in MEK, ethyl acetate, and toluene, respectively. The weight gains in MEK and ethyl acetate are greater than is acceptable for the gravure application.

The same epoxy formulations (without amine) were prepared and tested for viscosity as described above. Their viscosities at 25° C. were 465 and 367 cp, respectively, for Comparative Examples A and B, value that are consistent with their excellent observed coatability.

Although engravability, wear resistance, and viscosity for these formulations were consistent with good performance as printing forms for gravure, the solvent resistance of these formulations in MEK and ethyl acetate make them unsuitable for this application.

Examples 2-8, Comparative Example C

These examples demonstrate that, over a range of formulations with epoxy novolac, bisphenol epoxy, mono-functional diluent, and multi-functional diluent, solvent resistance and viscosity are suitable for a printing form for gravure.

For these examples, the ingredients DEN 431 epoxy novolac, GY-285 bisphenol F epoxy, DY-P mono-functional diluent, and DY-D di-functional diluent were combined in the amounts shown in Table 2. First DY-P and DY-D were combined in a flask. Then DEN 431 was added to the flask and the mixture was stirred briefly. GY-285 bisphenol F epoxy was added and the mixture was placed in a 50° C. water bath and stirred until completely uniform. The mixture was degassed under vacuum (200-1000 millitorr) to remove gas bubbles and then cooled to room temperature.

The viscosity of these formulations was determined as described above. Results are given in Table 2.

For solvent resistance measurements, the amount of DETA amine indicated in Table 2 was weighed out and added to the corresponding epoxy mixture and stirred for approximately 10 minutes. These coatings were cast onto aluminum foil placed over a steel plate using a drawdown knife with a 15 mil (381 μm) gap. The coated foil was cured at 100° C. for 1 h and then 150° C. for 1 h and allowed to cool. Film fragments peeled from the foil were tested for solvent resistance in MEK as described above. Results are presented in Table 2. Percentages in parentheses are weight percentages with respect to the epoxy/diluent component (epoxy resins plus diluents combined) of the formulation.

TABLE 2

| Example | DEN431 (g) | GY 285 (g) | DY-P (g) | DY-D (g) | DETA (g) | Viscosity at 25° C. (cp) | % wt gain in 7 days in MEK |
|---|---|---|---|---|---|---|---|
| Comp Ex C | 6.007 (29.9%) | 7.026 (35.0%) | 3.501 (17.4%) | 3.541 (17.6%) | 2.44 | 422 | 22.1 |
| 2 | 6.929 (34.6%) | 8.098 (40.4%) | 2.500 (12.5%) | 2.497 (12.5%) | 2.44 | 779 | 11.8 |
| 3 | 10.009 (49.9%) | 5.041 (25.1%) | 2.505 (12.5%) | 2.519 (12.5%) | 2.42 | 1050 | 5.7 |
| 4 | 7.616 (38.1%) | 8.876 (44.4%) | 2.630 (13.1%) | 0.884 (4.4%) | 2.36 | 1704 | 5.0 |
| 5 | 7.614 (38.0%) | 8.903 (44.4%) | 1.767 (8.8%) | 1.761 (8.8%) | 2.43 | 1373 | 4.1 |
| 6 | 5.507 (27.5%) | 11.025 (55.0%) | 1.759 (8.8%) | 1.759 (8.8%) | 2.44 | 1140 | 5.1 |
| 7 | 5.855 (29.2%) | 11.783 (58.7%) | 1.220 (6.1%) | 1.207 (6.0%) | 2.43 | 1888 | 2.7 |
| 8 | 5.854 (29.2%) | 11.745 (58.6%) | 0.606 (3.0%) | 1.829 (9.1%) | 2.48 | 1616 | 1.3 |

These results show workable viscosity and good solvent resistance over a range of formulations with different diluent levels and different fractions of each resin and diluent, MEK solvent resistance was good for formulations at least up to 25% total diluent (Examples 2 and 3), but a formulation with 35% total diluent did not have acceptable solvent resistance (Comparative Example C).

Examples 9-13

These examples demonstrate that, over a range of formulations with epoxy novolac, bisphenol epoxy, mono-functional diluent, and multi-functional diluent, solvent resistance, viscosity, and engravability are suitable for a printing form for gravure.

For these examples, DEN 431 epoxy novolac, GY-285 bisphenol F epoxy, DY-P mono-functional diluent, and DY-D di-functional diluent were combined in the amounts shown in Table 3. First DY-P and DY-D were combined in a flask. Then DEN 431 was added to the flask and the mixture was stirred briefly. GY-285 bisphenol F epoxy was added and the mixture was placed in a 50° C. water bath and stirred until completely uniform. The mixture was degassed under vacuum (200-1000 millitorr) to remove gas bubbles and then cooled to room temperature.

The viscosities of the formulations of Example 11 and 12 were determined as described above. The viscosities of formulations equivalent to Examples 9, 10, and 13 were previously determined in Examples 4, 5, and 8, respectively. Results are presented in Table 3.

For solvent resistance measurements, the amount of DETA amine indicated in Table 3 was weighed out and added to the corresponding epoxy mixture and stirred for approximately 10 minutes. These coatings were cast onto aluminum foil placed over a steel plate using a drawdown knife with a 15 mil (381 μm) gap. The coated foil was cured at 100° C. for 1 h and then 150° C. for 1 h and allowed to cool. Film fragments peeled from the foil were tested for solvent resistance in MEK, ethyl acetate, and toluene as described above. Results are presented in Table 3.

TABLE 3

| Example | DEN 431 (g) | GY 285 (g) | DY-P (g) | DY-D (g) | DETA (g) | Viscosity at 25° C. (cp) | % wt gain in 7 days in MEK | Ethyl acetate | Toluene |
|---|---|---|---|---|---|---|---|---|---|
| 9 | 15.232 (37.9%) | 17.816 (44.4%) | 5.253 (13.1%) | 1.845 (4.6%) | 4.748 | 1704* | 0.0 | 1.4 | 0.5 |
| 10 | 15.275 (38.1%) | 17.754 (44.3%) | 3.512 (8.8%) | 3.514 (8.8%) | 4.826 | 1373* | 1.0 | 2.5 | 1.3 |
| 11 | 15.283 (38.1%) | 17.816 (44.4%) | 1.760 (4.4%) | 5.248 (13.1%) | 5.041 | 1167 | 0.6 | 0.0 | 0.2 |
| 12 | 22.071 (55.0%) | 11.043 (27.5%) | 1.773 (4.4%) | 5.271 (13.1%) | 5.010 | 1642 | 1.6 | 0.4 | 0.1 |
| 13 | 11.742 (29.3%) | 23.474 (58.6%) | 1.210 (3.0%) | 3.605 (9.0%) | 5.009 | 1616* | 1.1 | 0.3 | 0.9 |

*Viscosity data from equivalent formulations in Ex. 4, 5, and 8, respectively.

The same formulations used to prepare specimens for solvent resistance testing were also used to coat sections of a large metal cylinder. Each coating solution was introduced into a metal syringe. It was then coated onto the cylinder that had been preheated to between 37 and 45° C. to obtain a coating 7.4-8.5 mil (188-216 μm) thick. The cylinder was coated using a brush technique with a combined syringe pump and translator mechanism to deliver material to obtain the desired coating thickness (6-10 mils, 152-254 μm). The coatings were then cured at 100° C. for 1 h and then 150'C for 1 h and avowed to cool to ambient temperature gradually. All five compositions coated and cured to form an excellent cured layer on the cylinder.

The cured layer on the cylinder was ground and polished mechanically to a uniform thickness and then engraved on an Ohio R-7100 series engraver at cell rate 3200 Hz, with vertical screen setting 274 cells/Rev, Horizontal screen setting 80 cells/length & single repeat setting 800¼ cells. The screen was 80 lines/cm, angle 60 deg, tone 100% & diamond face angle 120 deg. Engraving quality was excellent: Examples 9, 10 and 12 had <1% broken cell walls at 100% cell density, Example 11 had 2% broken cell walls, and Example 13 had 3% broken cell walls.

The cylinder coated above was not a compatible size for wear testing. Therefore, three of the best performing formulations, those of Examples 9, 10, and 11, were coated onto a smaller cylinder for wear testing. The coating procedure was the same as above, except the cylinder was preheated to between 53 and 60° C. and the resulting coating thicknesses were 7.5, 16, and 7.9 mils (190, 406, and 201 μm), respectively, for the three coatings. The thicker coating for the Example 10 formulation was due to incorrect coating settings, but did not significantly affect the subsequent testing.

These coatings were cured as above, sanded instead of ground, and then engraved as above. A wear test was performed on these cylinder coatings according to the method described above. The reduction in cell area induced by the in-house tester was 1.9, 2.4, and 4.8%, respectively, for Examples 9, 10, and 11, indicative of good wear resistance.

These results show workable viscosity, excellent solvent resistance, good engravability, and good wear resistance over a range of formulations with different fractions of each resin and diluent.

Examples 14-17, Comparative Example D

These examples demonstrate that solvent free epoxy mixtures consisting of an epoxy novolac, bisphenol epoxy, mono- and multi-functional diluents can be formulated with 6 wt % total diluent and still have workable viscosity for coating of a gravure cylinder.

For these examples, the components DEN 431 epoxy novolac, GY-285 bisphenol F epoxy, DY-P mono-functional diluent, and DY-D di-functional diluent were combined in the amounts shown in Table 4. First DY-P and DY-D were combined in a flask. Then DEN 431 was added to the flask and the mixture was stirred briefly. GY-285 bisphenol F epoxy was added and the mixture was placed in a 50° C. water bath and stirred until completely uniform. The mixture was degassed under vacuum (200-1000 millitorr) to remove gas bubbles and then cooled to room temperature.

The viscosities of the formulations were determined as described above. Results are presented in Table 4.

TABLE 4

| Example | DEN 431 (g) | GY 285 (g) | DY-P (g) | DY-D (g) | Viscosity at 25° C. (cp) |
|---|---|---|---|---|---|
| 14 | 2.930 (29.3%) | 5.876 (58.8%) | 0.297 (3.0%) | 0.897 (9.0%) | 1660 |
| 15 | 2.998 (29.9%) | 6.009 (60.0%) | 0.247 (2.5%) | 0.757 (7.6%) | 1980 |
| 16 | 3.078 (30.6%) | 6.189 (61.5%) | 0.201 (2.0%) | 0.599 (5.9%) | 2499 |
| 17 | 3.134 (31.3%) | 6.278 (62.7%) | 0.150 (1.5%) | 0.451 (4.5%) | 3328 |
| Comp Ex D | 3.198 (31.9%) | 6.409 (64.0%) | 0.103 (1.0%) | 0.300 (3.0%) | 4013 |

Even Example 17, with only 6 wt % total diluent, had a viscosity that is below the maximum viscosity (approximately 3500 cp) that provides good coatability. Comparative Example D, with 4 wt % diluent, had a viscosity a little higher, but a coating process with mild warming of the coating mixture is expected to yield good coatability for ft.

Examples 18-20

These examples demonstrate that formulations with different types of bisphenol epoxy, mono-functional diluent, and multi-functional diluent have workable viscosities and good solvent resistance for a printing form for gravure.

For these examples, the ingredients of the epoxy/diluent component were combined in the amounts shown in Table 5. First, the diluents were combined in a flask. Then DEN 431 was added to the flask and the mixture was stirred briefly. Then the bisphenol epoxy was added, and the mixture was placed in a 50° C. water bath and stirred until completely uniform. The mixture was degassed under vacuum (200-1000 millitorr) to remove gas bubbles and then cooled to room temperature.

The viscosities of the formulations were determined as described above. Results are given in Table 6.

For solvent resistance measurements, the amount of BETA amine indicated in Table 5 was weighed out and added to the indicated amount of each epoxy mixture and stirred for approximately 10 minutes. These coatings were cast onto aluminum foil placed over a steel plate using a drawdown knife with a 15 mil (381 μm) gap. The coated foil was cured at 100° C. for 1 h and then 150° C. for 1 h and allowed to cool. Film fragments peeled from the foil were tested for solvent resistance in MEK, ethyl acetate, and toluene as described above. Results are given in Table 6.

TABLE 5

| | Epoxy Novolac | | Bisphenol Epoxy | | Mono-functional diluent | | Multi-functional diluent | | Total epoxy/diluent mixed with | |
|---|---|---|---|---|---|---|---|---|---|---|
| Example | Amount (g) | Type | Amount (g) | Type | Amount (g) | Type | Amount (g) | Type | DETA (g) | Amount DETA |
| 18 | 7.620 (38.1%) | DEN 431 | 8.877 (44.3%) | DER 331 | 1.757 (8.8%) | DY-P | 1.771 (8.8%) | DY-D | 10.014 | 1.218 g |

TABLE 5-continued

| Example | Epoxy Novolac Amount (g) | Type | Bisphenol Epoxy Amount (g) | Type | Mono-functional diluent Amount (g) | Type | Multi-functional diluent Amount (g) | Type | Total epoxy/diluent mixed with DETA (g) | Amount DETA |
|---|---|---|---|---|---|---|---|---|---|---|
| 19 | 7.620 (38.0%) | DEN 431 | 8.880 (44.3%) | GY-285 | 1.756 (8.8%) | BGE | 1.771 (8.8%) | DY-D | 18.086 | 2.354 g |
| 20 | 7.622 (38.0%) | DEN 431 | 8.881 (44.3%) | GY-285 | 1.771 (8.8%) | DY-P | 1.763 (8.8%) | DY-T | 16.272 | 2.057 g |

TABLE 6

| Example | Viscosity at 25° C. (cp) | % wt. gain in 7 days in MEK | Ethyl acetate | toluene |
|---|---|---|---|---|
| 18 | 2613 | 3.1 | 1.3 | 1.5 |
| 19 | 814 | 1.0 | 3.9 | 1.8 |
| 20 | 2709 | 2.0 | 0.4 | 1.2 |

These results show workable viscosity for coating and excellent solvent resistance is obtained with formulations containing different types of bisphenol epoxy resins and diluent mixtures.

Comparative Examples E, F, and G

These comparative examples demonstrate that an epoxy with a higher softening temperature cannot be a major component of a solvent free epoxy formulation with viscosity and solvent resistance suitable for use as a printing form for gravure.

For these examples, ECN 1273 epoxy cresol novolac, GY-285 bisphenol F epoxy, DY-P mono-functional diluent, and DY-D di-functional diluent were combined in the amounts shown in Table 7. First DY-P and DY-D were combined in a flask. Then ECN 1273 was added to the flask and the mixture was stirred briefly. GY-285 bisphenol F epoxy was added and the mixture was placed in a 75-80° C. water bath and stirred until the ECN 1273 was melted and dissolved and the mixture was completely uniform. The water bath temperature was lowered to 56° C., the mixture was degassed under vacuum (200-1000 millitorr) to remove gas bubbles and then cooled to room temperature.

The viscosities of the formulations were determined as described above. Results are given in Table 7. Of the three formulations, only Comparative Example G, with 35% total diluent, had a viscosity that was in a workable range for coating a cylinder at room temperature.

TABLE 7

| Comparative Example | ECN 1273 (g) | GY 285 (g) | DY-P (g) | DY-D (g) | Viscosity at 25° C. (cp) |
|---|---|---|---|---|---|
| E | 7.624 (38.1%) | 8.875 (44.3%) | 1.760 (8.8%) | 1.759 (8.8%) | 22386 |
| F | 7.625 (38.1%) | 6.378 (31.9%) | 3.001 (15.0%) | 3.011 (15.0%) | 5862 |
| G | 6.000 (29.9%) | 6.997 (34.9%) | 3.567 (17.8%) | 3.500 (17.4%) | 1890 |

1.986 g DETA amine was combined with 16.546 g of the epoxy mixture of Comparative Example G and stirred for approximately 10 minutes. This coating was cast onto aluminum foil placed over a steel plate using a drawdown knife with a 15 mil (381 µm) gap. The coated foil was cured at 161° C. for 1 h and then 156° C. for 1 h and allowed to cool. Film fragments peeled from the foil were tested for solvent resistance in MEK, ethyl acetate, and toluene as described above. Results are 16.2 wt % uptake of MEK, 5.1 wt % uptake of ethyl acetate, and 3.8 wt % uptake of toluene after 7 days immersion.

These results suggest that including an epoxy cresol novolac with a softening point over 60° C. as a major component of a solvent free epoxy formulation does not permit the simultaneous attainment of a workable viscosity and good solvent resistance.

Comparative Examples H, I

These comparative examples demonstrate the effect of omitting one of the ingredients of the epoxy/diluent component of the curable composition.

The four-component epoxy/diluent formulation of Example 1 was taken as the base formulation. Two three-component epoxy/diluent formulations were prepared in the same way as for Example 1, utilizing the amounts given in Table 8. For all of these formulations, the total amount of epoxy resin(s) (82.5%) and of reactive diluent(s) (17.5%) was held constant.

The viscosities of the formulations were determined as described above. Results are given in Table 9.

For solvent resistance measurements, the amount of DETA amine indicated in Table 8 was weighed out and added to the indicated amount of each epoxy/diluent mixture and stirred for approximately 10 minutes. These coatings were cast onto aluminum foil placed over a steel plate using a drawdown knife with a 15 mil (381 µm) gap. The coated foil was cured at 100° C. for 1 h and then 150° C. for 1 h and allowed to cool. Film fragments peeled from the foil were tested for solvent resistance in MEK, ethyl acetate, and toluene as described above. Results are given in Table 9, along with data from Example 1 for reference.

TABLE 8

| Example | DEN 431 (g) | GY 285 (g) | DY-P (g) | DY-D (g) | Amount of epoxy/diluent mixed with DETA | DETA (g) |
|---|---|---|---|---|---|---|
| 1 | 13.285 (38.0%) | 15.555 (44.5%) | 4.594 (13.1%) | 1.539 (4.4%) | 34.973 | 4.135 |
| Comp. Ex. H | 16.509 (82.4%) | 0 | 2.629 (13.1%) | 0.906 (4.5%) | 10.447 | 1.270 |
| Comp. Ex. I | 7.623 (38.1%) | 8.883 (44.4%) | 0 | 3.497 (17.5%) | 8.853 | 1.188 |

TABLE 9

| | | % wt. gain in 7 days in | | |
|---|---|---|---|---|
| Example | Viscosity at 25° C. (cp) | MEK | Ethyl Acetate | Toluene |
| 1 | 1689 | 1.8 | 1.2 | 0.4 |
| Comp. Ex. H | 5507 | 0.5 | 2.6 | 1.1 |
| Comp. Ex. I | 1143 | 0.1 | 0.1 | 1.5 |

All of these formulations provided good solvent resistance. Comparative Example I, without DY-P, had a workable viscosity. Comparative Example H, without GY 285, had a viscosity that is too high for good coatability at room temperature; this formulation had too high a level of the semi-solid DEN 431 epoxy novolac.

The formulation of Comparative Example I was coated onto a cylinder in the same way as Example 1, except that a cylinder temperature of 65 to 70° C. was used during coating. The composition coated and cured to form a good cured layer on the cylinder. However, the coating of Comparative Example I, did not sand well, resulting in an uneven thickness of 4 to 10 mils (100 to 250 μm). In contrast, for Example 1, the cured layer on the cylinder was ground and polished mechanically to a uniform thickness of 5 mils (127 μm) and then engraved. Engraving quality was excellent, with <1% broken cell walls at 100% cell density.

Examples 21-23, Comparative Examples J, K, and L

These examples demonstrate that the choice of amine curing agent is important in achieving the good solvent resistance needed for a printing form for gravure.

For these examples, two batches of epoxy/diluent component were prepared with the following amounts of ingredients: Batch 1 consisted of 15.241 g (38.1 wt %) DEN 431, 17.762 g (44.4 wt %) GY-285, 5.248 g (13.1 wt %) DY-P, and 1.767 g (4.4 wt %) DY-D. Batch 2 consisted of 8,276 g (38.1 wt %) DEN 431, 9.638 g (44.4 wt %) GY-285, 2.855 g (13.1 wt %) DY-P, and 0.958 g (4.4 wt %) DY-D. For each batch, first DY-P and DY-D were combined in a flask. Then DEN 431 was added to the flask and the mixture was stirred briefly. GY-285 bisphenol F epoxy was added and the mixture was placed in a 50'C water bath and stirred until completely uniform. The mixture was degassed under vacuum (200-1000 millitorr) to remove gas bubbles and then cooled to room temperature.

For solvent resistance measurements, the amount of amine indicated in Table 10 was weighed out and added to the indicated amount of epoxy formulation and stirred for approximately 10 minutes. These coatings were cast onto aluminum foil placed over a steel plate using a drawdown knife with a 15 mil (381 μm) gap. The coated foil was cured at 100° C. for 1 h and then 150'C for 1 h and allowed to cool. Film fragments peeled from the foil were tested for solvent resistance in MEK, ethyl acetate, and toluene as described above. Results are given in Table 10.

TABLE 10

| | | | | | % wt. gain in 7 days in | | |
|---|---|---|---|---|---|---|---|
| | Epoxy/diluent component | | Amine curing agent | | | Ethyl | |
| Example | Batch | Amount (g) | Type | Amount (g) | MEK | Acetate | Toluene |
| 21 | 1 | 6.560 | DETA | 0.787 | 5.7 | 1.2 | 0.9 |
| 22 | 1 | 5.610 | TETA | 0.787 | 5.8 | 2.6 | 1.0 |
| 23 | 1 | 5.313 | Aradur 355 | 1.593 | 6.5 | 2.0 | 2.1 |
| Comp. Ex. J | 1 | 5.085 | Jeffamine T-403 | 2.393 | 33.3 | 31.0 | 30.1 |
| Comp. Ex. K | 2 | 8.023 | AEP | 2.010 | 24.6 | 9.7 | 3.6 |
| Comp. Ex. L | 2 | 7.971 | IPDA | 1.958 | 35.7 | 14.5 | 1.2 |

These results show that the amine curing agent choice can have a large effect on solvent resistance with a given epoxy formulation.

Examples 24-25, Comparative Example M

These examples demonstrate that good solvent resistance needed for a printing form for gravure can be achieved with 1,2-diaminocyclohexane (DACH) as the curing agent.

The epoxy formulation for these examples consisted of 38.1 wt % DEN 431, 44.4 wt % GY-285, 13.1 wt % DY-P, and 4.4 wt % DY-D. These components were combined in a flask and placed in a 50° C. water bath and stirred until completely uniform. The mixture was degassed under vacuum (200-1000 mtorr) to remove gas bubbles and then cooled to room temperature.

For Comparative Example M, 0.866 g DACH was weighed out and added to 5.256 g epoxy formulation and stirred for approx. 10 minutes. A coating was cast onto aluminum foil placed over a steel plate using a drawdown knife with a 15 mil (381 µm) gap. The coated foil was cured at 100° C. for 1 h and then 150° C. for 1 h and allowed to cool.

For Examples 24 and 25, modifications were made in the curing agent formulation and conditions to minimize or compensate for the effect of DACH volatility. Modifications included delaying the casting and curing of the amine epoxy mixture to allow partial reaction to occur prior to heating, a low temperature curing step, slightly increasing the amount of DACH in the formulation, and addition of a curing accelerator.

For Example 24, 1.363 g DACH was weighed out and added to 7.625 g epoxy formulation and stirred for approx. 10 minutes. The mixture was held at room temperature for 3 hours and then cast onto aluminum foil placed over a steel plate using a drawdown knife with a 15 mil (381 µm) gap. The coated foil was cured at 50° C. for 1 h and then 150° C. for 1 h and allowed to cool.

For Example 25, 1.419 g DACH amine and 0.425 g DMP-30 accelerator were weighed out and added to 8.303 g epoxy formulation and stirred for approx. 10 minutes. The mixture was held at room temperature for 3 hours and then cast onto aluminum foil placed over a steel plate using a drawdown knife with a 15 mil (381 µm) gap. The coated foil was cured at 50° C. for 1 h and then 110° C. for 1 h and allowed to cool.

Film fragments peeled from the foils were tested for solvent resistance in MEK, ethyl acetate, and toluene as described above. Results are given in Table 11.

TABLE 11

| | % wt. gain in 7 days in | | |
|---|---|---|---|
| Example | MEK | Ethyl Acetate | Toluene |
| Comp. Ex. M | 16.3 | 3.3 | 1.5 |
| 24 | 8.9 | 3.7 | −0.8 |
| 25 | 1.5 | 0.0 | 0.6 |

Comparative Example M is somewhat high in MEK uptake. This result is believed to be due to some loss of the rather volatile DACH, which causes the ratio of amine hydrogen to epoxy functionality to be outside the preferred stoichiometric range. Examples 24 and 25 demonstrate that more volatile amines like DACH may be employed in formulations with good solvent resistance provided the formulation and conditions minimize or compensate for the volatility of the amine.

Example 26

This example demonstrates that good solvent resistance needed for a printing form for gravure may be achieved by adding the combination of a curing agent and an accelerator to an epoxy formulation and subjecting the formulation to a short curing time at a moderate curing temperature.

The epoxy formulation for this example consisted of 38.1 wt % DEN 431, 44.4 wt % GY-285, 13.1 wt % DY-P, and 4.4 wt % DY-D. These components were combined in a flask and placed in a 50° C. water bath and stirred until completely uniform. The mixture was degassed under vacuum (200-1000 mtorr) to remove gas bubbles and then cooled to room temperature.

0.636 g DETA amine and 0.101 g DMP-30 accelerator were weighed out and added to 5.169 g epoxy formulation and stirred for approx. 10 minutes. The coating was cast using a drawdown knife with a 20 mil (508 µm) gap onto aluminum foil placed on a hot plate warmed to 65° C. After 10 minutes at 65° C., the hot plate temperature was raised to 110° C. and held at that temperature for 20 minutes. The coated foil was removed from the hot plate and allowed to cool to room temperature.

Two film fragments peeled from the foil were tested for solvent resistance in MEK. The weight gain after 7 days immersion in MEK was 1.7% and 1.9% for these two specimens.

Example 27

This example demonstrates that a printing form prepared according to the instant invention exhibits good long-run print trial performance.

53.345 g (38.1 wt % of epoxy/diluent component) DEN 431 epoxy novolac, 62,170 g (44.4 wt %) GY-285 bisphenol F epoxy, 18.340 g (13.1 wt %) DY-P diluent and 6.162 g (4.4 wt %) DY-D diluent were combined in a flask. The mixture was placed in a 50° C. water bath and stirred until completely uniform. The mixture was degassed under vacuum (200-1000 millitorr) to remove gas bubbles.

16.522 g DETA amine was added to 133.8 g epoxy mixture and stirred for approximately 10 minutes. The resulting coating solution was introduced into a metal syringe. It was then coated onto a metal cylinder that had been preheated to 85-70° C. to obtain a coating 8.65-9.65 mils (220-240 µm) thick. The cylinder was coated using a brush technique with a combined syringe pump and translator mechanism to deliver material to obtain the desired coating thickness. The coating was then cured at 100° C. for 1 h and then 150° C. for 1 h and allowed to cool to ambient temperature gradually. The composition coated and cured to form an excellent cured layer on the cylinder.

The cured layer on the cylinder was then machined and polished. The layer was then electromechanically engraved on an Ohio R-7100 series engraver at a cell rate of 3200 Hz with a 120 degree diamond stylus at various angles and lpi densities according to CMYK specifications. The engraved cylinder was then used for printing with toluene-based cyan ink on C1S paper. Initial print quality was excellent. After about 440,000 revolutions (220,000 meters), the print quality was as good as the initial print.

What is claimed is:

1. A process for preparing a printing form comprising:
   a) applying a solvent-free curable composition to form a layer on a supporting substrate, the solvent-free curable composition comprising:
      i) an epoxy novolac resin;
      ii) a bisphenol-A epoxy resin or a bisphenol-F epoxy resin;
      iii) a monofunctional reactive diluent;
      iv) a multifunctional reactive diluent; and,
      v) a stoichiometric amount of a multifunctional amine curing agent;
   wherein i) and ii) together are at least 70 wt % of i), i), and iv) together; and the ratio of i) to ii) is 1:3 to 3:1 by weight;
   b) curing the layer at one or more temperatures in a range of room temperature to 250° C.; and
   c) engraving at least one cell in the layer resulting from step b).

2. The process of claim 1 wherein curing the layer occurs at room temperature.

3. The process of claim 1 wherein curing the layer comprises heating the layer at one temperature in the range, or heating the layer at two temperatures in the range.

4. The process of claim 1 wherein the amine curing agent has an amine hydrogen equivalent weight of 20 to 40 g/equivalent.

5. The process of claim 1 wherein the amine curing agent is selected from the group consisting of: triethylenetetramine, diethylenetriamine, tetraethylenepentamine; 1,2-diaminocyclohexane; 1,3-bis(aminomethyl)cyclohexane; m-phenylenediamine; m-xylylene diamine; and mixtures of these.

6. The process of claim 1 wherein the monofunctional epoxy reactive diluent is selected from the group consisting of: p-tertiarybutyl phenol glycidyl ether, cresyl glycidyl ether, benzyl glycidyl ether, 2-ethylhexyl glycidyl ether, and $C_8$-$C_{14}$ glycidyl ether.

7. The process of claim 1 wherein the multifunctional epoxy reactive diluent is selected from the group consisting of: 1,4-butanediol diglycidyl ether, neopentyl glycol diglycidyl ether, cyclohexane dimethanol diglycidyl ether, and trimethylol propane triglycidyl ether.

8. The process of claim 1 wherein the composition further comprises an accelerator.

9. The process of claim 8 wherein the accelerator is selected from the group consisting of: imidazoles, tris(dimethylaminomethyl)phenol, and nonyl phenol.

10. The process of claim 1 wherein the composition further comprises up to 30 wt % nanoparticles having at least one dimension less than 500 nm.

11. The process of claim 10 wherein the nanoparticles comprise at least one member of the group consisting of: aluminum oxides, colloidal silica, fumed silica, zinc oxide, zirconium oxide, titanium oxide, tungsten oxides, magnesium oxides, tungsten carbides, silicon carbide, titanium carbide, boron nitrides, molybdenum disulfide, clay, carbon nanotubes, carbon black, carbon filaments, and mixtures thereof.

12. The process of claim 1 wherein the composition further comprises up to 50 wt % filler having at least one dimension greater than 500 nm.

13. The process of claim 1 wherein the supporting substrate is in the form of a cylinder or sheet.

14. The process of claim 1 wherein the epoxy novolac resin has a molecular weight of 312 to 1000 and an epoxide equivalent weight of 156 to 200 g/equivalent; the bisphenol A epoxy resin or bisphenol F epoxy resin has a molecular weight of 312 to 1200 and epoxide equivalent weight of 156 to 600 g/equivalent; and the amine curing agent has an amine hydrogen equivalent weight of 20 to 40 g/equivalent.

15. The process of claim 14 wherein the curable composition further comprises an accelerator selected from the group consisting of: imidazoles, tris(dimethylaminomethyl)phenol, and nonyl phenol.

16. The process of claim 14 wherein the curable composition further comprises up to 30 wt % nanoparticles having at least one dimension less than 500 nm, and selected from aluminum oxides, colloidal silica, fumed silica, zinc oxide, zirconium oxide, titanium oxide, tungsten oxides, magnesium oxides, tungsten carbides, silicon carbide, titanium carbide, boron nitrides, molybdenum disulfide, clay, carbon nanotubes, carbon black, carbon filaments, and mixtures thereof.

17. The process of claim 14 wherein the curable composition comprises:
   a) an epoxy novolac resin having an epoxide equivalent weight of about 172 to about 179 g/equivalent;
   b) a bisphenol F epoxy resin having an epoxide equivalent weight of 163 to 172 g/equivalent;
   c) diethylenetriamine;
   d) a mixture of p-tert-butylphenyl glycidyl ether plus 1,4-butanediol diglycidyl ether in a weight ratio of about 3:1 p-tert-butylphenyl glycidyl ether:1,4-butanediol diglycidyl ether;
wherein the ratio of the epoxy novolac resin to the bisphenol F epoxy resin is about 6:7 by weight; and mixture d) of p-tert-butylphenyl glycidyl ether plus 1,4-butanediol diglycidyl ether, is 15 to 20 wt % of the epoxy/diluent component a)+b)+d).

18. The process of claim 1 wherein i) and ii) together are 70 to 95 wt % of i) ii), iii), and iv) together.

19. The process of claim 1 wherein the ratio of iii) to iv) is 4:1 to 1:4 by weight.

20. The process of claim 1 wherein the epoxy novolac resin has a softening point less than 60° C.

21. The process of claim 1 wherein the bisphenol-A epoxy resin or the bisphenol-F epoxy resin has a softening point less than 60° C.

22. A process for gravure printing with a printing form comprising:
   a) preparing the printing form having a cured layer according to the process of claim 1;
   b) applying are ink to the at least one cell, and
   c) transferring ink from the cell to a printable substrate,
wherein the cured layer swells ≤12% based on weight of the layer.

* * * * *